US010111400B2

(12) United States Patent
Bonnier et al.

(10) Patent No.: US 10,111,400 B2
(45) Date of Patent: *Oct. 30, 2018

(54) CLAW FOR A MILKING MACHINE (71) Applicant: DELAVAL HOLDING AB, Tumba (SE)

(72) Inventors: Tor Bonnier, Tumba (SE); Nathalie Back, Tumba (SE); Emil Olsson, Tumba (SE); Markus Stridsberg, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 197 days.

This patent is subject to a terminal disclaimer.

(21) Appl. No.: 14/649,621

(22) PCT Filed: Dec. 18, 2013

(86) PCT No.: PCT/SE2013/051559
§ 371 (c)(1),
(2) Date: Jun. 4, 2015

(87) PCT Pub. No.: WO2014/098753
PCT Pub. Date: Jun. 26, 2014

(65) Prior Publication Data
US 2015/0313173 A1 Nov. 5, 2015

Related U.S. Application Data (60) Provisional application No. 61/739,122, filed on Dec. 19, 2012.

(30) Foreign Application Priority Data

Dec. 19, 2012 (SE) ...................... 1251457

(51) Int. Cl.
*A01J 5/04* (2006.01)

(52) U.S. Cl.
CPC ............... *A01J 5/041* (2013.01); *A01J 5/044* (2013.01)

(58) Field of Classification Search
CPC ...... A01J 5/00; A01J 5/04; A01J 5/041; A01J 5/044
See application file for complete search history.

(56) References Cited

U.S. PATENT DOCUMENTS 1,363,739 A * 12/1920 Jonsson .................... A01J 5/04
119/14.46
1,477,978 A * 12/1923 Sabroe .................... A01J 5/041
119/14.38

(Continued)

FOREIGN PATENT DOCUMENTS

DE          6604310 U      1/1970
DE   10 2006 022 624 A1   11/2007

(Continued)

OTHER PUBLICATIONS

International-Type Search Report, dated Jun. 10, 2013, from corresponding PCT application.

(Continued)

*Primary Examiner* — Monica L Williams
*Assistant Examiner* — Michael A. Fabula
(74) *Attorney, Agent, or Firm* — Young & Thompson (57) ABSTRACT A claw for a milking machine includes an enclosure having an upper part and a lower part and enclosing an inner space for a milk flow during a milking operation. A center axis extends through the enclosure and through the upper lower parts. The upper part includes an upper end defining an upper end point, and a lower annular end extending along a periphery of the claw in a connection plane. The lower part is detachably connected to the upper part along the connection plane, and rotary symmetric with respect to an axis of rotation being perpendicular to the connection plane. The (Continued)

connection plane is inclined with respect to the center axis so that the enclosure has a first height at a first peripheral position greater than and a second height at a second peripheral position diametrically opposite to the first peripheral position.

17 Claims, 4 Drawing Sheets

(56) References Cited

U.S. PATENT DOCUMENTS

| | | | | |
|---|---|---|---|---|
| 2,683,437 A * | 7/1954 | Merritt | ............ | A01J 5/041 |
| | | | | 119/14.13 |
| 2,706,965 A * | 4/1955 | Thomas | ............ | A01J 5/04 |
| | | | | 119/14.01 |
| 2,735,399 A * | 2/1956 | Henrard | ............ | A01J 5/04 |
| | | | | 119/14.14 |
| 2,775,225 A * | 12/1956 | Brown | ............ | A01J 5/041 |
| | | | | 119/14.54 |
| 2,777,420 A * | 1/1957 | Schilling | ............ | A01J 5/041 |
| | | | | 119/14.02 |
| 2,783,737 A * | 3/1957 | Thomas | ............ | A01J 5/041 |
| | | | | 119/14.12 |
| 2,869,512 A * | 1/1959 | Merritt | ............ | A01J 5/041 |
| | | | | 119/14.05 |
| 2,896,574 A | 7/1959 | Larsen | | |
| 3,014,455 A | 12/1961 | Olander | | |
| 3,029,787 A * | 4/1962 | Lamberson | ............ | A01J 5/041 |
| | | | | 119/14.45 |
| 3,139,856 A * | 7/1964 | Lippke | ............ | A01J 5/041 |
| | | | | 119/14.36 |
| 3,150,637 A * | 9/1964 | Fosnes | ............ | A01J 5/041 |
| | | | | 119/14.54 |
| 3,172,391 A * | 3/1965 | Norton | ............ | A01J 5/041 |
| | | | | 119/14.01 |
| 3,726,252 A * | 4/1973 | Needham | ............ | A01J 5/01 |
| | | | | 119/14.08 |
| 3,741,161 A * | 6/1973 | Zhuk | ............ | A01J 5/041 |
| | | | | 119/14.36 |
| 4,287,853 A * | 9/1981 | Duncan | ............ | A01J 5/041 |
| | | | | 119/14.55 |
| 4,395,971 A * | 8/1983 | Happel | ............ | A01J 5/041 |
| | | | | 119/14.36 |
| 4,395,972 A * | 8/1983 | Griffin | ............ | A01J 5/041 |
| | | | | 119/14.55 |
| 4,434,744 A * | 3/1984 | Millar | ............ | A01J 5/041 |
| | | | | 119/14.02 |
| 4,671,209 A * | 6/1987 | Whittlestone | ............ | A01J 7/005 |
| | | | | 119/14.55 |
| 4,907,535 A * | 3/1990 | Matsuzawa | ............ | A01J 5/041 |
| | | | | 119/14.55 |
| 5,076,211 A * | 12/1991 | Tonelli | ............ | A01J 5/041 |
| | | | | 119/14.54 |
| 5,291,853 A * | 3/1994 | Steingraber | ............ | A01J 5/041 |
| | | | | 119/14.54 |
| 5,988,105 A * | 11/1999 | Sandgren | ............ | A01J 5/041 |
| | | | | 119/14.54 |
| 6,006,695 A * | 12/1999 | Gustafsson | ............ | A01J 5/041 |
| | | | | 119/14.54 |
| D418,951 S | 1/2000 | Gustafsson | | |
| 6,058,880 A * | 5/2000 | Gustafsson | ............ | A01J 5/041 |
| | | | | 119/14.54 |
| 6,401,655 B1 * | 6/2002 | Terwilleger | ............ | A01J 5/041 |
| | | | | 119/14.16 |
| 6,439,157 B1 * | 8/2002 | Petterson | ............ | A01J 5/041 |
| | | | | 119/14.47 |
| 6,571,827 B1 * | 6/2003 | Gustafsson | ............ | A01J 5/017 |
| | | | | 119/14.55 |
| 6,981,468 B1 * | 1/2006 | Steingraber | ............ | A01J 5/041 |
| | | | | 119/14.54 |
| 7,021,239 B2 * | 4/2006 | Steingraber | ............ | A01J 5/041 |
| | | | | 119/14.54 |
| 9,247,708 B2 * | 2/2016 | Kochman | ............ | A01J 5/00 |
| 9,861,069 B2 * | 1/2018 | La Torre | ............ | A01J 5/041 |
| 2005/0229858 A1 * | 10/2005 | Steingraber | ............ | A01J 5/041 |
| | | | | 119/14.54 |
| 2006/0254524 A1 * | 11/2006 | Happel | ............ | A01J 5/041 |
| | | | | 119/14.54 |
| 2007/0272160 A1 * | 11/2007 | Berentzen | ............ | A01J 5/041 |
| | | | | 119/14.54 |
| 2014/0033982 A1 * | 2/2014 | Serafini | ............ | A01J 5/041 |
| | | | | 119/14.54 |
| 2014/0209030 A1 * | 7/2014 | Brown | ............ | A01J 5/041 |
| | | | | 119/14.54 |
| 2015/0320005 A1 * | 11/2015 | La Torre | ............ | A01J 5/041 |
| | | | | 119/14.54 |

FOREIGN PATENT DOCUMENTS

| | | | |
|---|---|---|---|
| EP | 2 179 644 A1 | 4/2010 | |
| GB | 776020 A | 5/1957 | |
| GB | 855778 A * | 12/1960 | ............ A01J 5/04 |
| GB | 1295917 A | 11/1972 | |
| JP | 08508650 A | 9/1996 | |
| JP | 2000503852 A | 4/2000 | |
| RU | 2 457 675 C2 | 8/2012 | |
| SU | 1523139 A1 | 11/1989 | |
| SU | 1639537 A1 | 4/1991 | |
| WO | 9423562 A1 | 10/1994 | |
| WO | 9727737 A1 | 8/1997 | |

OTHER PUBLICATIONS

International Search Report, dated May 8, 2014, from corresponding PCT application.
Supplementary International Search Report, dated Mar. 20, 2015, from corresponding PCT application.
Nov. 10, 2017, JP communication issued for related JP application No. 2015549318.

* cited by examiner

CLAW FOR A MILKING MACHINE

TECHNICAL FIELD OF THE INVENTION

The present invention refers generally to a claw, or a teatcup claw, included in a milking member of a milking machine. More specifically, the present invention refers to a so called top flow claw, where an outlet nipple, which is connected to the long milk conduit for the discharge of milk from the claw, is mounted on the top of the claw. The present invention refers to a claw as disclosed below. Such a claw is disclosed in U.S. Pat. No. 6,058,880.

BACKGROUND OF THE INVENTION AND PRIOR ART

The claw disclosed in U.S. Pat. No. 6,058,880 collects milk from the teatcups via the short milk conduits. The collected milk is continuously transported from the claw to a suitable milk storage via the long milk conduit. The known claw is a top flow claw having a suction tube connecting the inner space of the claw with the outlet nipple for the discharge of the milk through the long milk conduit from the claw. This means that the milk to be transported has to be lifted from the bottom region of the inner space of the claw to the outlet nipple. Such top flow claws are also disclosed in U.S. Pat. No. 6,006,695 and U.S. Pat. No. 5,076,211.

Another problem to be considered is the ergonomic design of the claw. A claw having a large height or thickness may be difficult to grip and hold during the attachment of the teatcups to the teats of the animal to be milked. It is important that the operator may grip the claw and hold it firmly in a convenient manner during said attachment.

A still further problem to be considered is the visibility and the possibility for the operator to observe the milk flow through the claw.

SUMMARY OF THE INVENTION

The object of the present invention is to provide a claw having improved properties with respect to.

This object is achieved by the claw initially defined, which is characterised in that the connection plane is inclined with respect to the centre axis so that the enclosure has a first height at a first peripheral position and a second height at a second position diametrically opposite to the first peripheral position, and that the first height is greater than the second height.

By inclining or sloping the connection plane so that the height of the enclosure, and thus the claw, is reduced at the second peripheral position, i.e. on one side of the claw, the total volume of the inner space and the height of the inner space may be reduced. Such an asymmetrical design of the claw enables the provision of a shorter suction tube, and thus a reduction of the energy required for transporting the milk, and especially for lifting the milk through the suction tube to the outlet nipple.

Furthermore, the reduced height of the claw is positive from an ergonomic point of view due to the fact that the claw is easier to grip and hold for the operator during the attachment of the teatcups to the teats of the animal. Depending on individual preferences of the operator he or she may choose to grip and hold the claw at the thinnest side, the thickest side or therebetween.

Thanks to the inclination, the visibility of the milk flow may be maintained through the thicker side of the claw, which advantageously may comprise a transparent zone. The milk and the milk flow may be observed clearly and properly through a transparent zone at this position.

A small volume of the inner space may also be advantageous with respect to the quality of the milk. A small volume means less air contact, and less oxidation of important substances in the milk, i.e. an improved FFA-value.

According to an embodiment of the invention, the upper part comprises an upper wall, through which a plurality of inlet members configured for receiving a respective short milk conduit extend, and a side wall connected to the upper wall. Advantageously, the side wall has varying wall height along the periphery and a first wall height at the first peripheral position and a second wall height at the second peripheral position, wherein the first wall height is larger than the second wall height. The varying height or thickness of the claw may be achieved through such a varying wall height of the side wall. The upper wall may then extend along a cone being rotary symmetric around the centre axis. Thus the asymmetry of the claw is comprised by the side wall of the upper part.

According to a further embodiment of the invention, the upper part is at least partly made of a transparent material to enable observation of the milk flow in the inner space during the milking operation. Advantageously, the upper part has a transparent zone extending at least inside the first peripheral position. As explained above the upper part has a higher height inside the first peripheral position, which improves the possibilities for the operator to observe the milk flow through the transparent zone of the upper part during milking. Preferably, the transparent zone extends over both the upper wall and the side wall. It is to be noted that the upper part as a whole may be manufactured in a transparent material, preferably a transparent plastic material.

According to a further embodiment of the invention, the claw comprises an outlet nipple configured for being connected to a long milk conduit for the discharge of milk from inner space, and wherein the outlet nipple extends outwardly from the upper part towards the first peripheral position. The outlet nipple is thus located above the thicker side of the enclosure.

According to a further embodiment of the invention, the claw comprises a peripheral ring extending along the periphery at the connection plane. Advantageously, the peripheral ring may be made of a rubber material, such as natural rubber, synthetic rubber, silicon rubber etc. A rubber material facilitates for the operator to grip and to hold firmly the claw during the attachment of the teatcups to the teats. Furthermore, the peripheral ring may comprises at least one outwardly extending wing positioned between the first peripheral position and the second peripheral position. Such a wing also contributes to improve the gripping and holding of the claw during the attachment of the teatcups. Advantageously, the peripheral ring may comprise two such outwardly extending wings positioned diametrically opposite to each other.

According to a further embodiment of the invention, the upper part has at least one grip-facilitating pattern on an outer surface of the upper part, which pattern is located radially inside said wing. Advantageously, the upper part may have two grip-facilitating patterns on the outer surface of the upper part, which patterns are located radially inside a respective wing of the peripheral ring. The grip-facilitating pattern may be located on the upper wall and each comprise an number of ribs projecting from the outer surface of the upper wall of the upper part. The grip-facilitating pattern or patterns also improves the gripping and holding of the claw during the attachment of the teatcups to the teats of the animal.

According to a further embodiment of the invention, the lower part comprises a central depression extending inwardly. The depression may thus be concave seen form outside the claw and as such contribute to a better grip and holding of the claw. From the inner space the depression may be convex and hence contribute to a better milk flow from the inner space into a suction tube connecting the inner space to the outlet nipple for conveying the milk from the inner space to the outlet nipple.

According to a further embodiment of the invention, the lower part is detachably connected to the upper part along the connection plane by means of a bayonet coupling. The claw may thus be demounted by a convenient short rotation of the lower part in relation to the upper part. Advantageously, the bayonet coupling may comprise at least two pins extending from one of the upper part and the lower part, and at least two grooves provided in the other of the upper part and the lower part and each configured to receive a respective one of the pins.

According to a further embodiment of the invention, the lower part is bowl-shaped. The lower part may be manufactured of sheet metal or plastics.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS OF THE INVENTION

FIGS. 1 to 4 discloses a claw C, or a teatcup claw C, of a milking member for a milking machine. The claw C comprises an enclosure having an upper part 1 and a lower part 2. The enclosure encloses an inner space 3 for receiving milk and conveying a milk flow during a milking operation. The lower part 2 comprises a bottom surface 4 facing the inner space 3. A centre axis x extends through the enclosure and through the upper part 1 and the lower part 2. The upper part 1 comprises an upper end 5 having an annular shape and defining an upper end point 5', or an upper end plane. The upper part 1 also comprises an upper end portion 6 extending from the upper end 5. Furthermore, the upper part 1 comprises a lower annular end 7 extending along a periphery of the claw C in or at a connection plane p. The lower part 2 is detachably connected to the upper part 1 along the connection plane p.

Figure 3:
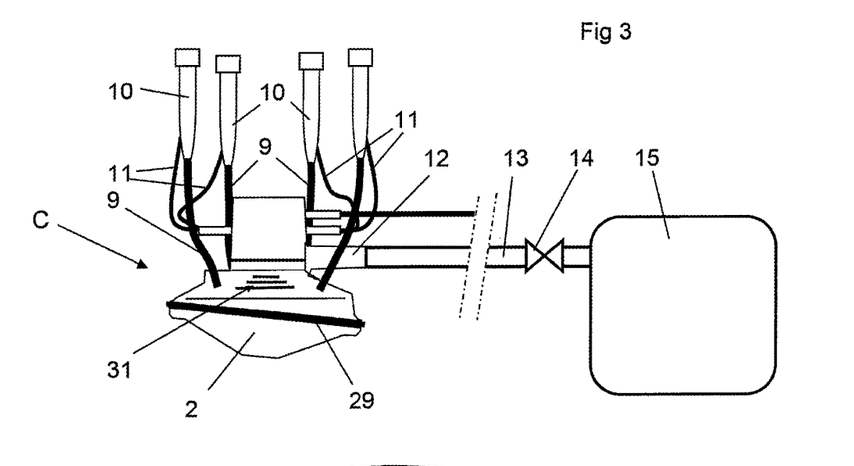
FIG. 3 shows schematically a side view of a milking member comprising a claw according to the present invention.

The claw C comprises a plurality of inlet members 8 configured for receiving a respective short milk conduit 9 of a respective teatcup 10 of the milking member, see FIG. 3. Each teatcup 10 is configured to be attached to a respective teat of an animal to be milked during a milking operation. The milking member also comprises four short pulse conduits 11, one for each teatcup 10.

The claw C disclosed comprises four inlet members 8 which each extends through the upper part 1 to permit feeding of milk to the inner space 3 from the respective teatcup 10 and the respective teat. The claw C also comprises an outlet nipple 12 configured for being connected to a long milk conduit 13 for the discharge of milk from the inner space 3 to a milk receiving member 15 of a milking machine. The outlet nipple 12 extends outwardly with respect to the centre axis x from the upper part 1 of the enclosure. During the milking operation, milk is sucked through the teatcups 10, the short milk conduits 9 into the inner space 3 of the claw C by means of the application of a milking vacuum generated by a vacuum pump (not disclosed). From the inner space 3, the milk is then sucked through the long milk conduit 13 to the milk receiving member 15 by means of the vacuum pump. A shut-off valve 14 may be provided on the long milk conduit 13 permitting automatic shut-off of the milk vacuum between the milking operations.

The upper part 1 comprises an upper wall 16, through which the inlet members 8 extend, and a side wall 17 connected to the upper wall 16. The side wall 17 thus adjoins the upper wall 16 at an outer corner extending around the enclosure. The upper wall 16 adjoins the upper end portion 6 at an inner corner extending around the enclosure. An air inlet 18 extends into the inner space 3 from the surroundings, and in the embodiments disclosed through the upper part 1.

Figure 2:
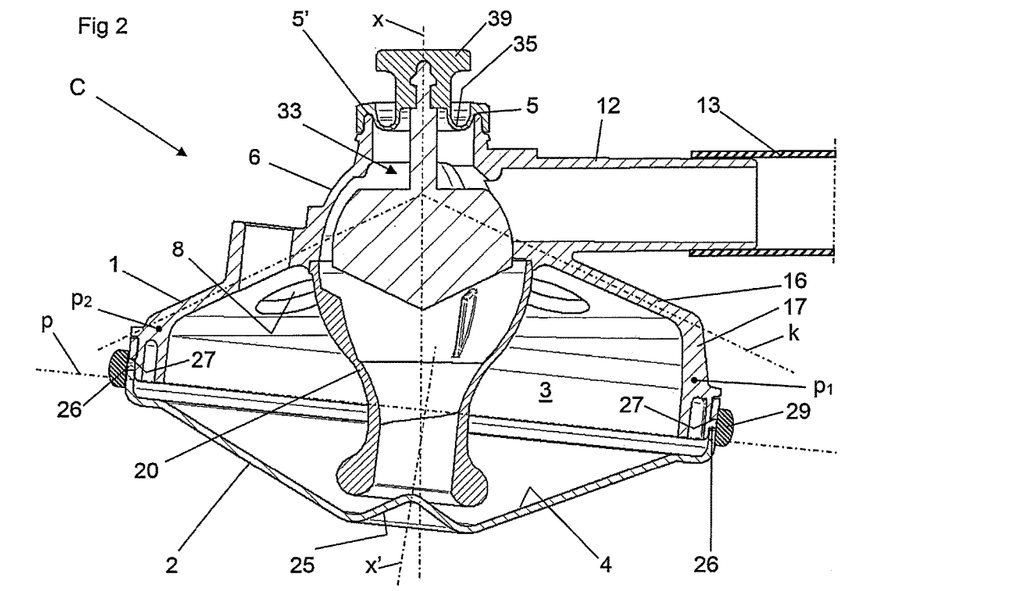
FIG. 2 shows schematically a sectional view through a claw according to a second embodiment of the invention.

The upper wall 16 extends along a cone k, which is rotary symmetric around the centre axis x, see FIG. 2. The side wall 17 has a varying wall height along the periphery of the claw C. More specifically, the side wall 17 has a first wall height that a first peripheral position $p_1$ and a second wall height at a second peripheral position $p_2$. The first wall height is larger than the second wall height. The first peripheral position $p_1$ is diametrically opposite to the second peripheral position $p_2$.

Figure 1:
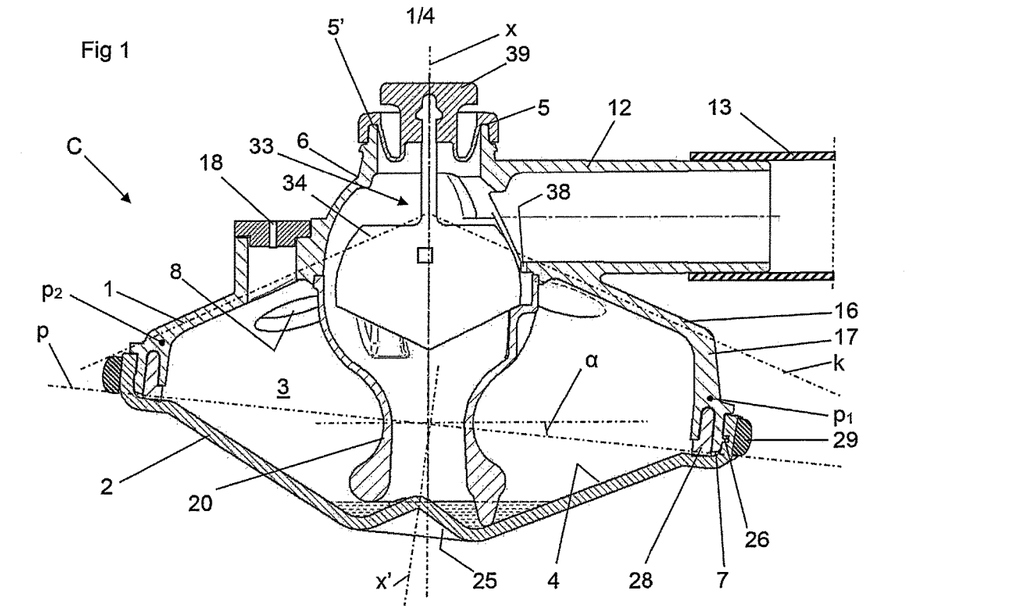
FIG. 1 shows schematically a sectional view through a claw according to a first embodiment of the invention.

As can be clearly seen in FIGS. 1 and 2 the connection plane p is inclined with respect to the centre axis x so that the enclosure have a first height at the first peripheral position $p_1$ and a second height at the second peripheral position $p_2$, i.e. that the first height is greater than the second height. The connection plane p thus forms an angle α of inclination to a plane perpendicular to the centre axis x, or horizontal plane. The angle α may be 4-8°, for instance 6° or approximately 6°. In the embodiments disclosed, this varying height of the claw C is thus achieved by varying the wall height of the side wall 17. It is to be noted that the varying height also could be achieved by a non-rotary symmetric configuration of the upper wall 16 so that at least a part of the varying height of the claw C is achieved by the upper wall 16.

The lower part 2 is rotary symmetric with respect to an axis x' of rotation, which axis x' is perpendicular to the connection plane p see FIG. 2, and thus forms an angle of indication to the centre axis x, being equal to the angle α.

The claw C also comprises a suction tube 20 which is provided in the inner space 3 and which connects the inner space 3 to the outlet nipple 12 for conveying the milk from the inner space 3 to the outlet nipple 12. The suction tube 20 comprises a lower tube section 20a, an intermediate tube section 20b and an upper tube section 20c, see FIGS. 4-6. The upper tube section 20c extends from an upper end of the suction tube 20 to the intermediate tube section 20b, and the intermediate tube section 20b extends from the upper tube section 20c to the lower tube section 20a. The lower tube section 20a is positioned above and in the proximity of the bottom surface 4 of the lower part 2. The suction tube 20 comprises at least one support leg 21 extending from the lower tube section 20a and abutting the bottom surface 4. The suction tube 20 may comprises more than one support legs 21, such as two or three as in the following description of the embodiments. Thanks to the support legs 21, a gap is formed between the lower tube section 20a and the bottom surface 4. Each support leg 21 has an end point. The end points of the support legs 21 are located in a common lower plane p' which is inclined to the centre axis x, and which is parallel with the connection plane p. The upper end of the suction tube 20 defines an upper plane which also is inclined to the common lower plane p'.

The suction tube 20 is a separate part which may be attached by friction to the upper part 1. The upper tube section of 20c of the suction tube 20 is tapering from the upper end to the intermediate tube section 20b to form an internal space which is a concavely shaped as can be seen in FIGS. 1,2 and 4-6. The upper tube section 20c has a convexly shaped outer surface. The intermediate tube section 20b is cylindrical, or substantially cylindrical. The lower tube section 20a comprises a thickened torus-shaped ring with a radius r, when seen in a cross sectional plane including the centre axis x. The suction tube 20 has an inner radius R at the lower tube section 20a. The relation r/R lies in the range 0.3 to 0.7, for instance 0.45, see FIGS. 5 and 6.

Figures 4, 5, 6:
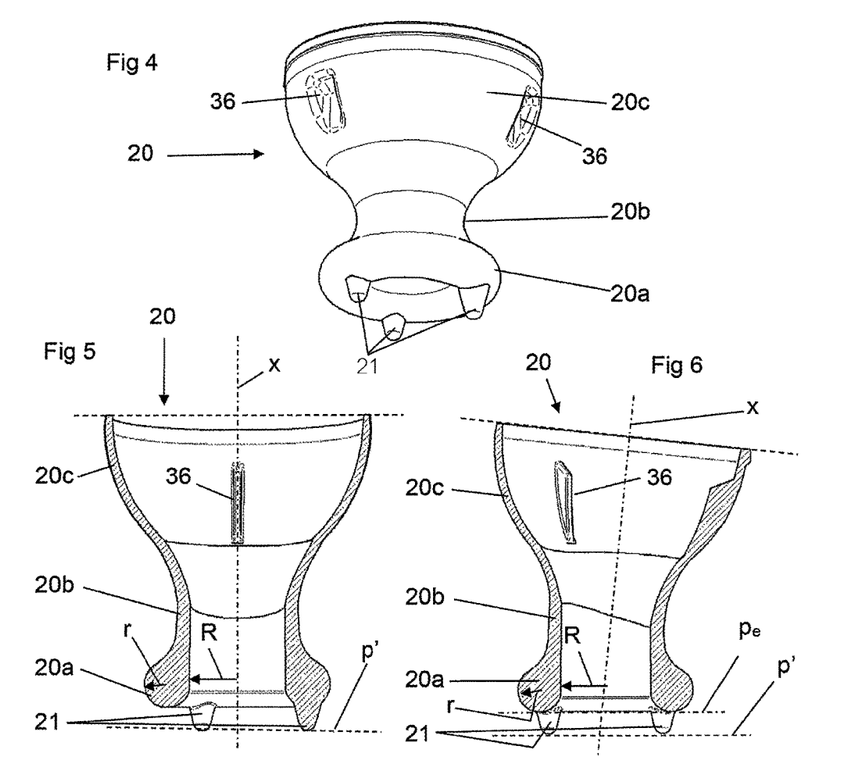
FIG. 4 shows schematically a perspective view of a suction tube of the claw in FIG. 1.
FIG. 5 shows schematically a sectional view of the suction tube in FIG. 4.
FIG. 6 shows schematically a perspective view of a suction tube of the claw in FIG. 2.

The suction tube 20 is shown in two variants one first variant for the first embodiments shown in FIGS. 1, 4 and 5, and a second variant for the second embodiment shown in FIGS. 2 and 6.

In the first variant, the gap between the lower tube section 20a and the bottom surface 4 has a varying height with a first height at a first position along the lower tube section 20a, and a second height at a second position along the lower tube section 20a. The second position is diametrically opposite to the first position. The first height is greater than the second height. The first position is located on the same radial line as the first peripheral position with respect to the centre axis x. The second position is located at the same radial line as the second peripheral position with respect to the centre axis x. In this variant at least one of the support legs 21 has a length that is different from the length of at least one of the other support legs 21.

In the second variant, the lower tube section 20a defines an annular end line from which the support legs 21 extend. The annular end line defines an end plane $p_e$, see FIG. 6, which is inclined in relation to the centre axis x. In this second variant, all support legs 21 have the same length.

The upper part 1 is at least partly made of a transparent material to enable observation of the milk flow in the inner space 3 during the milking operation. Advantageously, the whole upper part 1 may be made of the same transparent material. It is important that there is a transparent zone extending inside the first peripheral position where the side wall 17 has the largest height. The lower part 2 may be made of a plastic, transparent or non-transparent material as illustrated in FIG. 1. The lower part 2 may also be made of a metallic material as illustrated in FIG. 2.

The lower part 2 is bowl-shaped. Thus, the lower part 2 forms a part space of the inner space 3. The part space tapers from the connection plane p, as can be seen in FIGS. 1 and 2. The lower part 2 comprises a central depression 25 extending inwardly into the inner space 3 towards the interior of the suction tube 20. Thus, the lower part 2 tapers to the central depression 25. As mentioned above, the lower part 2 is rotary symmetric with respect to the axis x' of rotation. The central depression 25 is also rotary symmetric with respect to the axis x' of rotation.

Figure 7:
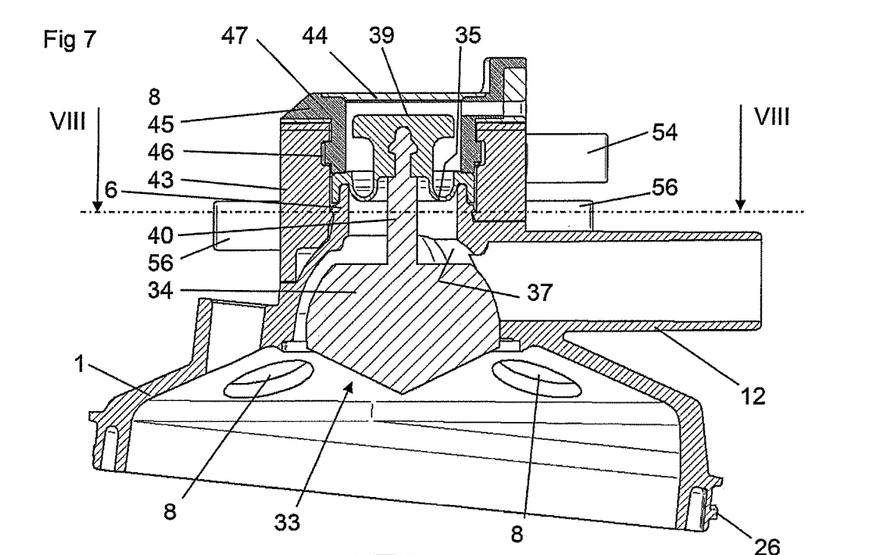
FIG. 7 shows schematically a sectional view of an upper part of the claw in FIGS. 1 and 2.

The lower part 2 is detachably connected to the upper part 1 along the connection plane p by means of a bayonet coupling as can be seen in FIGS. 1, 2 and 7. The bayonet coupling comprises at least two pins 26 extending from one of the upper part 1 and the lower part 2, in the present case from the upper part 1. The bayonet coupling also comprises at least two grooves 27 which in the present case thus is provided in the lower part 2, and configured to receive a respective one of the pins 26. With such a bayonet coupling, the lower part 2 may be easily detached from the upper part 1, and attached to the upper part 1. Such a bayonet coupling will also contribute to compress an annular gasket 28, see FIG. 1, provided between the upper part 1 and the lower part 2 at the connection plane p, to seal the inner space 3 from the environment.

Figure 8:
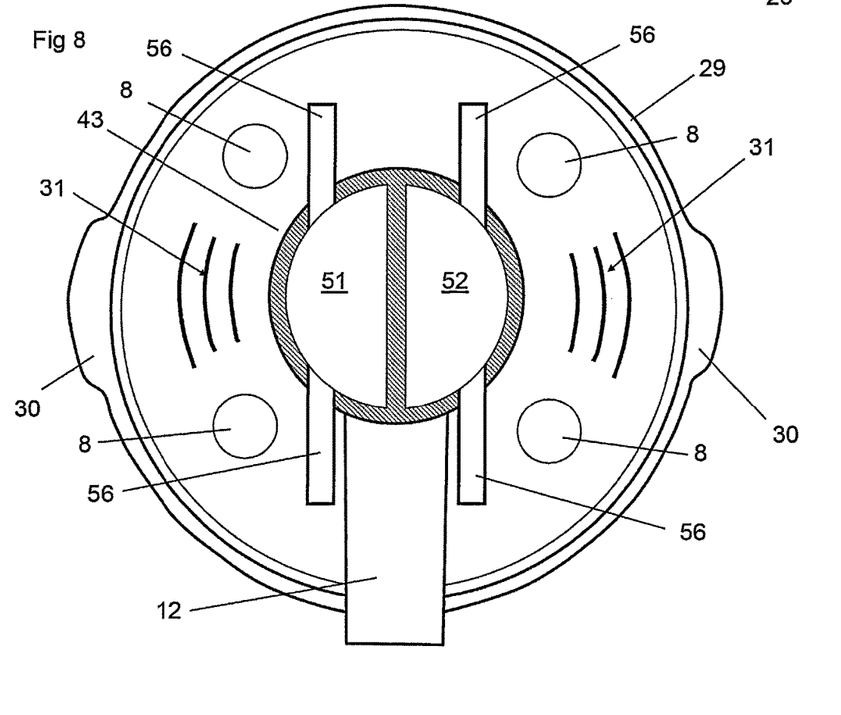
FIG. 8 shows schematically a sectional view along the line VIII-VIII in FIG. 7.

The claw C also comprises a peripheral ring 29, which extends along the periphery of the claw C at the connection plane p, see FIGS. 2 and 8. The peripheral ring 29 is made of an elastic material, for instance a rubber material, such as natural rubber or silicon rubber. The peripheral ring 29 comprises at least one, in the present case two, outwardly extending wings 30 positioned between the first peripheral position and the second peripheral position.

Furthermore, the upper part 1 has at least one, in the present case, two grip-facilitating patterns 31 provided on the outer surface of the upper part 1, see FIGS. 3 and 8. The patterns 31 are located radially inside a respective one of the wings 30. Each pattern 31 comprises three ribs on different distance from the centre axis x. The ribs extend in parallel with each other and the periphery of the enclosure.

The claw C also comprises a closing valve 33, which comprises a valve body 34 provided at the upper tube section 20c of the suction tube 20. The valve body 34 is movable to a closed position, see FIG. 11, in which the passage from the inner space 3 to the outlet nipple 12 is closed, and to an open position, see FIG. 10, in which the passage from the inner space 3 to the outlet nipple 12 is open. The closing valve 33 also comprises a membrane 35 which is connected to the valve body 34 and attached to the upper end portion 6 of the upper part 1. The membrane 35 has a rest state, in which the membrane 35 holds the valve body 34 in an intermediate position between the open position and the closed position, see FIG. 9.

In the rest state, there is no pressure difference over the valve body 34, i.e. the pressure on one side of the valve body 34, i.e. in the inner space 3, is equal to the pressure on the other side of the valve body 34, i.e. inside the outlet nipple 12. Moreover, in the rest state the membrane 35 may be in its most relaxed state with a minimum of internal tensions or stresses.

Figure 9:
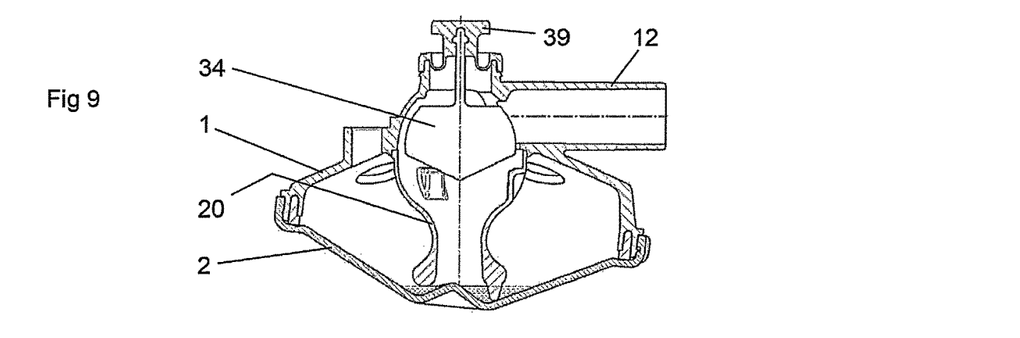
FIG. 9 shows schematically a sectional view of the claw according to the first embodiment with a valve body in an intermediate position.

The membrane 35 is configured for automatically moving the valve body 34 to the open position, to the closed position or to the intermediate position, see FIG. 9, between the open position and the closed position. Especially, the closing valve 33 and the membrane 35 is configured in such a way that the valve body 34 may be moved, or moved very quickly, from the intermediate position to the closed position or to the open position. The configuration of the membrane 35 to take the intermediate position when the membrane 35 is in its rest position thus provides for a closing valve 33 having a quick response.

When the shut-off valve 14 is closed, the membrane 35 will be in the rest state, i.e. the valve body 34 will be moved to and held in the intermediate position.

The closing valve 33 comprises a physical stop member defining the open position. In the embodiments disclosed, the physical stop member comprises at least three projections 36 projecting into the internal space of the upper tube section 20c of the suction tube 20.

The closing valve 33 also comprises a valve seat 37 defining the closed position. The valve body 34 thus rests against the valve seat 37 in the closed position.

Figure 11:
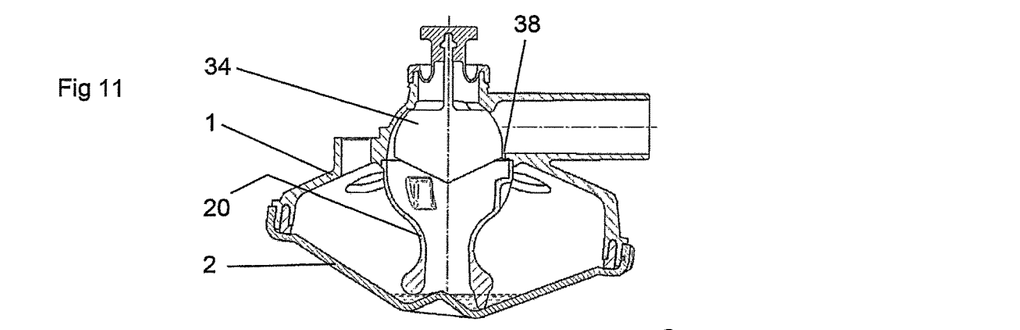
FIG. 11 shows schematically a view similar to the one in FIG. 9 with the valve body in a closed position.

Furthermore, a leakage channel 38 is provided for permitting a leakage flow from the inner space 3 to the outlet nipple 12 when the valve body 34 is in the closed position. In the embodiments disclosed, the leakage channel 38 is formed by a recess in the valve seat 37 as can be seen in FIGS. 1 and 11.

Furthermore, the closing valve 33 comprises a button member 39 connected to the valve body 34 via a rod 40. The button member 39 permits manual moving of the valve body 34, in particular towards the open position. The button member 39 projects upwardly from the upper part 1.

The claw C also comprises a housing 43, see FIGS. 7 and 8, which is attached to the enclosure and encloses the button member 39. The housing 43 comprises a cover 44 located outside the button member 39 to permit the manual moving of the valve body 34 by manual pressing of the cover 44.

The cover 44 is in the embodiment disclosed a part of an insert member 45 attached to an upper end portion of the housing 43 by means of a bayonet coupling 46. The insert member 45 comprises a base portion 47 to which the cover 44 is attached. The base portion 47 is made of a first material and the cover 44 is made of another, second material. The second material is resilient, or more resilient that the first material, thereby permitting the cover 44 to be elastically deformed.

The housing 43 comprises two separate channels, a first channel 51 and a second channel 52, see FIG. 7. Each channel 51, 52 has an inlet pipe 54, see FIG. 7, and two outlet pipes 56, see FIG. 8, for distributing a pulsating vacuum to the teatcups 10. The inlet pipes 54 and the outlet pipes 56 extend in parallel with each other, and with the outlet nipple 12. The two outlet pipes 56 of the first channel 51 extend in opposite directions, as well as the two outlet pipes 56 of the second channel 52.

Figure 10:
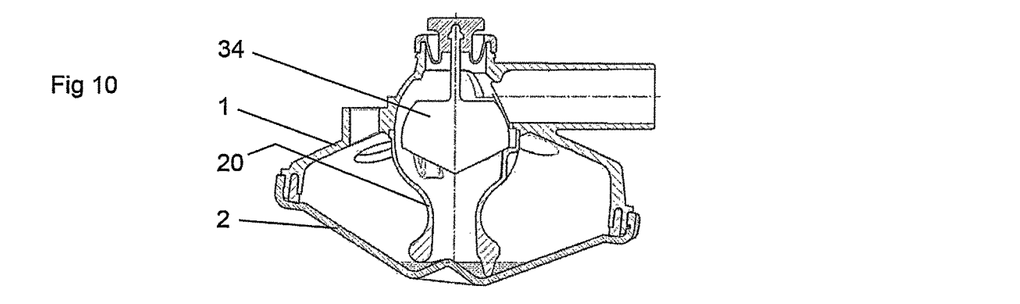
FIG. 10 shows schematically a view similar to the one in FIG. 9 with the valve body in an open position.

With reference to FIG. 10, the membrane 35 is configured to move the valve body 34 to and hold the valve body 34 in the open position against the physical stop member 36, when there is a milk flow through all of the inlet members 8, i.e. during milking of the animal. The membrane 35 is also configured to hold the valve body 34 in the open position when there is no milk flow, i.e. when all the short milk conduits 9 are closed, since the pressure in the outlet nipple 12 will be lower than in the inner space 3. The teatcups 10 will be closed when all teatcups 10 are hanging downwardly, thereby bending the short milk conduits 9 to close and prevent air from entering the inner space 3 of the claw C.

With reference to FIG. 11, the membrane 35 is configured to move the valve body 34 to and to hold the valve body 34 in the closed position against the valve seat 37, when the milk flow through one of the inlet members 8 is interrupted. When, for instance, one of the teatcups 10 falls off the teat, the membrane is configured to move immediately, or substantially immediately, the valve body 34 to the closed position in order to prevent air from entering the inner space 3 of the claw C.

When the teatcup 10 has fallen down completely the short milk conduit 9 will be closed. Thanks to the leak flow through the leakage channel 38, vacuum or a low pressure is created in the inner space 3, permitting the membrane 35 to move the valve body 34 once again to the open position, thereby permitting milking through the three teatcups 10 remaining on the respective teats. This procedure will be repeated at least also in case a second teatcup 10 falls off the teat, and possibly also in case a third teatcup 10 falls off the teat.

With reference to FIG. 9, the membrane 35 is configured to hold the valve body 34 in the intermediate position, between the closed position and the open position, during the application of the teatcups 10 to the respective teats of the animal. When the operator holds the claw C in un upright position, as illustrated in FIG. 5, before the teatcups 10 are attached to the teats, the teatcups 10 will all hang down and the short milk conduits 9 will be closed. When the operator lifts the first teatcup 10, the membrane 35 will move the valve body 34 from the open position shown in FIG. 12 to the intermediate position shown in FIG. 9. When the first teatcup 10 is attached the membrane 35 will move the valve body back to the open position shown in FIG. 10. This procedure is repeated until all four teatcups 10 have been attached to the respective teats.

The membrane 35 is thus configured to move the valve body 34 first to the intermediate position when a first teatcup 10 is lifted so that air may be sucked into the inner space 3 of the claw. Thanks to the leakage channel 38, the pressure difference over the valve body 34 will be reduced or removed when the valve body 34 is in the closed position, permitting the membrane 35 to move the valve body 34 to the intermediate position. From this intermediate position, the membrane 35 will then move the valve body 34 to the open position when said first teatcup 10 has been attached since the pressure in the inner space 3 will be reduced and become lower than the pressure in the outlet nipple 12. Consequently, the valve body 34 will, as explained above, respond quickly, i.e. open quickly when the first teatcup 10 is attached since the valve body 34 is starting from the intermediate position and thus moved only a short distance from the intermediate position to the open position.

Figure 12:
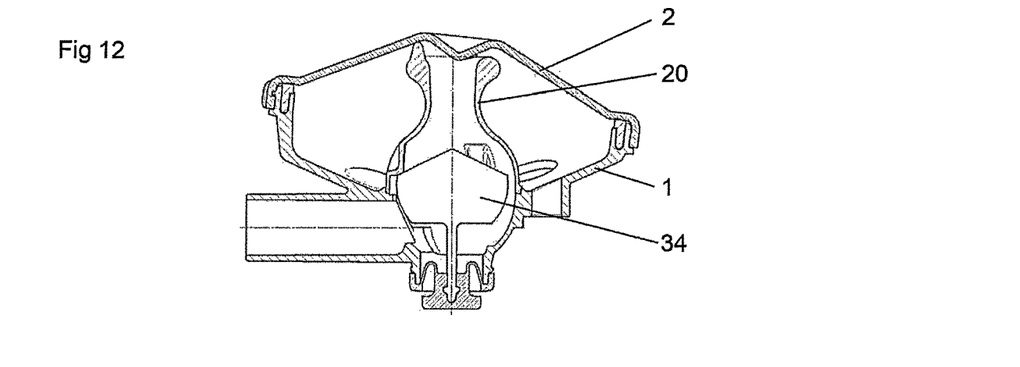
FIG. 12 shows schematically a sectional view of the claw in FIG. 9 in a washing position.

FIG. 12 shows the claw C in a up-side down position, suitable for washing of the claw C and the teatcups 10 of the milking member. The membrane 35 is configured to hold the valve body 34 in the open position during the washing operation. Before the washing operation is initiated, the milking vacuum is shut-off, for instance automatically by means of the shut-off valve 14, which means that the membrane 35 will move the valve body 34 to the intermediate position. The teatcups 10 and the claw C are positioned in the up-side down washing position, whereby the teatcups 10 are placed on suitable washing nozzles (not disclosed). The shut-off valve 14 is opened and the vacuum is applied causing the membrane 35 to move the valve body 34 to the open position so that washing liquid may be sucked and conveyed through the milking member.

The present invention is not limited to the embodiments disclosed, but may be varied and modified within the scope of the following claims.

The invention claimed is:

1. A claw (C) for a milking machine, comprising:
   an enclosure having an upper part (1) and a lower part (2) that together enclose an inner space (3) for a milk flow during a milking operation, the enclosure having a center axis (x) extending through the upper part (1) and the lower part (2), the center axis (x) defining a height direction of the enclosure,
   wherein the lower part (2) is detachably connected to the upper part (1) along a connection plane (p),
   wherein the upper part (1) comprises i) an upper end (5) defining an upper end point (5'), ii) an upper wall (16) adjoining the upper end (5), and iii) a lower annular end (7) at a periphery of the claw (C) in the connection plane (p),
   wherein the lower part (2) comprises a bottom surface (4) facing the inner space (3) with the center axis (x) extending through the bottom surface (4),
   wherein the lower part (2) is rotationally symmetric with respect to an axis (x') of rotation being perpendicular to the connection plane (p),
   wherein the center axis (x) is non-coincident with the axis (x') of rotation, and
   wherein the connection plane (p) is inclined with respect to the center axis (x) such that the enclosure has i) a first height at a first peripheral position ($p_1$) of the upper part, and ii) a second height at a second peripheral position ($p_2$) of the upper part, the second peripheral position ($p_2$) being diametrically opposite to the first peripheral position ($p_1$), the first height being greater than the second height; and
   an outlet nipple (12) extending from the end (5) and outwardly with respect to the center axis (x), the outlet nipple (12) providing a milk discharge path from the inner space (3), the outlet nipple (12) configured for connection to a long milk conduit (13) for discharge of milk from the inner space (3), wherein,
   the upper wall (16) further comprises a plurality of inlet members (8), each inlet member (8) configured for receiving a respective short milk conduit (9), and
   the lower annular end (17) comprises a lower side wall (17) adjoining a lower part of the upper wall (16) to the periphery of the claw (C) in the connection plane (p).

2. The claw (C) according to claim 1, wherein the side wall (17) has varying wall thickness along the periphery with a first wall thickness at the first peripheral position ($p_1$) and a second wall thickness at the second peripheral position ($p_2$), the first wall thickness being larger than the second wall thickness.

3. The claw (C) according to claim 2, wherein the upper wall (16) extends along an imaginary cone being rotationally symmetric around the center axis (x).

4. The claw (C) according to claim 1, wherein the upper wall (16) extends along an imaginary cone being rotationally symmetric around the center axis (x).

5. The claw (C) according to claim 1, wherein the upper part (1) is at least partly made of a transparent material to enable observation of the milk flow in the inner space (3) during the milking operation.

6. The claw (C) according to claim 1, wherein the upper part (1) has a transparent zone extending inside the first peripheral position ($p_1$).

7. The claw (C) according to claim 1, wherein the outlet nipple (12) extends outwardly from the upper part (1) towards the first peripheral position ($p_1$).

8. The claw (C) according to claim 1, further comprising a bayonet coupling that enables the lower part (2) to be detachably connected to the upper part (1) along the connection plane (p).

9. The claw (C) according to claim 8, wherein the bayonet coupling comprises:
   at least two pins (26) extending from one of the upper part (1) and the lower part (2), and
   at least two grooves (27) in the other of the upper part (1) and the lower part (2),
   each of the at least two grooves configured to receive a respective one of the at least two pins (26).

10. The claim according to claim 1, further comprising a suction tube (20) connecting the inner space (3) to the outlet nipple (12) and providing a path that conveys the milk from the inner space (3) to the outlet nipple (12),
   wherein the suction tube (20) comprises a lower tube section (20a) positioned in proximity of the bottom surface (4) with a gap present between the lower tube section (20a) and the bottom surface (4), and
   wherein the lower part (2) further comprises a central depression (25) extending inwardly toward the upper part (1), the center axis (x) and the axis (x') of rotation of the lower part extending through the depression (25).

11. The claim according to claim 10, wherein,
   the upper wall (16) further comprises a plurality of inlet members (8), each inlet member (8) configured for receiving a respective short milk conduit (9), and
   the upper part (1) further includes a transparent zone that enables observation of the milk flow in the inner space (3) during the milking operation.

12. A claw (C) for a milking machine, comprising:
   an enclosure having an upper part (1) and a lower part (2) that together enclose an inner space (3) for a milk flow during a milking operation, the enclosure having a center axis (x) extending through the upper part (1) and the lower part (2), the center axis (x) defining a height direction of the enclosure,
   wherein the lower part (2) is detachably connected to the upper part (1) along a connection plane (p),
   wherein the upper part (1) comprises i) an upper end (5) defining an upper end point (5'), ii) an upper wall (16) adjoining the upper end (5), and iii) a lower annular end (7) at a periphery of the claw (C) in the connection plane (p),
   wherein the lower part (2) comprises a bottom surface (4) facing the inner space (3) with the center axis (x) extending through the bottom surface (4),
   wherein the lower part (2) is rotationally symmetric with respect to an axis (x') of rotation being perpendicular to the connection plane (p),
   wherein the center axis (x) is non-coincident with the axis (x') of rotation, and
   wherein the connection plane (p) is inclined with respect to the center axis (x) such that the enclosure has i) a first height at a first peripheral position ($p_1$) of the upper part, and ii) a second height at a second peripheral position ($p_2$) of the upper part, the second peripheral position ($p_2$) being diametrically opposite to the first peripheral position ($p_1$), the first height being greater than the second height; and an outlet nipple (12) extending from the end (5) and outwardly with respect to the center axis (x), the outlet nipple (12) providing a milk discharge path from the inner space (3), the outlet nipple (12) configured for connection to a long milk conduit (13) for discharge of milk from the inner space (3), further comprising a peripheral ring (29) extending along the periphery at the connection plane (P).

13. The claw (C) according to claim 12, wherein the peripheral ring (29) is made of a rubber material.

14. The claw (C) according to claim 13, wherein the peripheral ring (29) comprises at least one outwardly extending wing (30) positioned between the first peripheral position ($p_1$) and the second peripheral position ($p_2$).

15. The claw (C) according to claim 12, wherein the peripheral ring (29) comprises at least one outwardly extending wing (30) positioned between the first peripheral position ($p_1$) and the second peripheral position ($p_2$).

16. The claw (C) according to claim 15, wherein the upper part has at least one grip-facilitating pattern (31) on an outer surface of the upper part (4), which pattern (31) is located radially inside said at least one outwardly extending wing (30).

17. A claw (C) for a milking machine, comprising:

an enclosure having an upper part (1) and a lower part (2) that together enclose an inner space (3) for a milk flow during a milking operation, the enclosure having a center axis (x) extending through the upper part (1) and the lower part (2), the center axis (x) defining a height direction of the enclosure, wherein the lower part (2) is detachably connected to the upper part (1) along a connection plane (p), wherein the upper part (1) comprises i) an upper end (5) defining an upper end point (5'), ii) an upper wall (16) adjoining the upper end (5), and iii) a lower annular end (7) at a periphery of the claw (C) in the connection plane (p), wherein the lower part (2) comprises a bottom surface (4) facing the inner space (3) with the center axis (x) extending through the bottom surface (4), wherein the lower part (2) is rotationally symmetric with respect to an axis (x') of rotation being perpendicular to the connection plane (p), wherein the center axis (x) is non-coincident with the axis (x') of rotation, and wherein the connection plane (p) is inclined with respect to the center axis (x) such that the enclosure has i) a first height at a first peripheral position ($p_1$) of the upper part, and ii) a second height at a second peripheral position ($p_2$) of the upper part, the second peripheral position ($p_2$) being diametrically opposite to the first peripheral position ($p_1$), the first height being greater than the second height; and an outlet nipple (12) extending from the end (5) and outwardly with respect to the center axis (x), the outlet nipple (12) providing a milk discharge path from the inner space (3), the outlet nipple (12) configured for connection to a long milk conduit (13) for discharge of milk from the inner space (3), wherein the lower part (2) comprises a central depression (25) extending inwardly toward the upper part (1), the center axis (x) extending through the depression (25).

* * * * *